(No Model.)
C. BUSWELL.
Seeding Machine.
No. 241,924. Patented May 24, 1881.
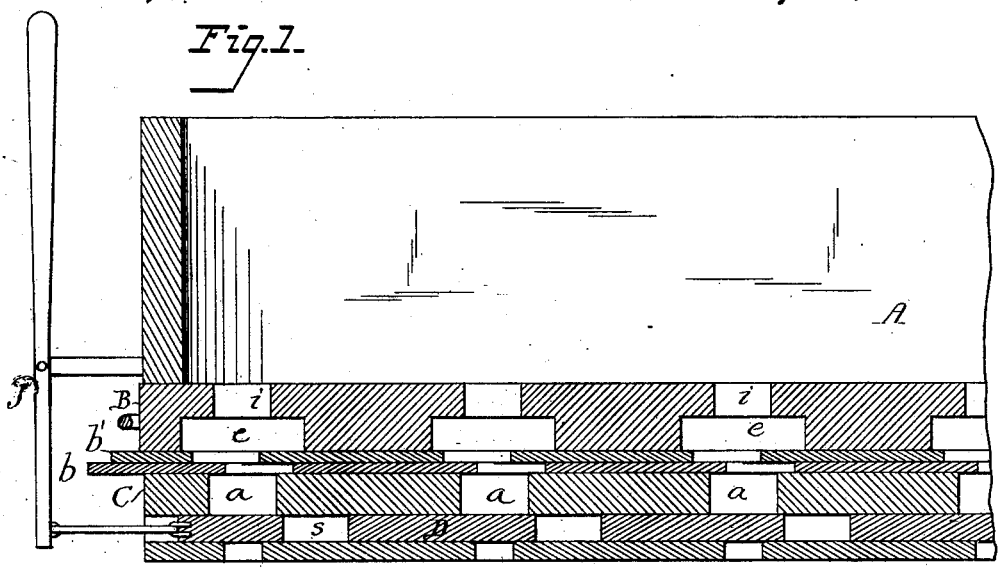
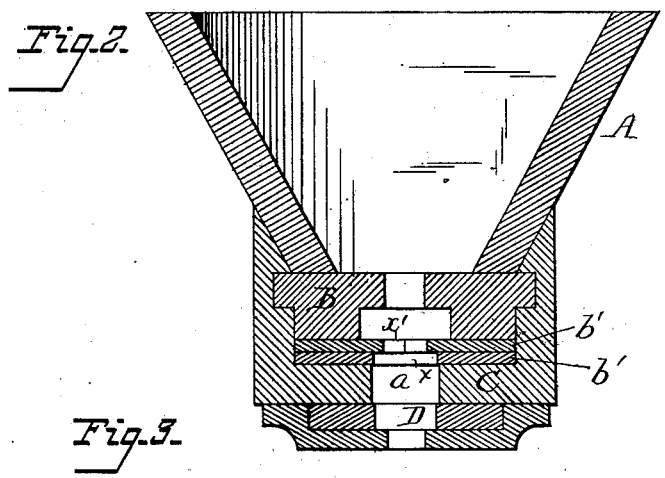
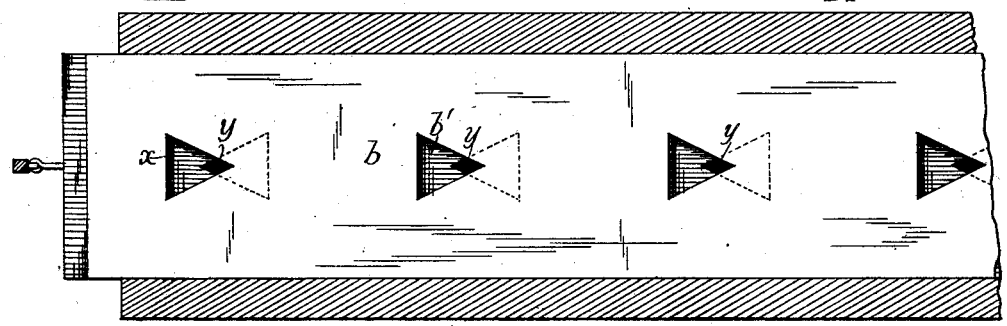
Attest:
Courtney C. Cooper
J. O. McCleary
C. Buswell
By his atty
Charles E. Foster
N. PETERS, Photo-Lithographer, Washington, D. C.

UNITED STATES PATENT OFFICE.

COLUMBUS BUSWELL, OF ETNA, MAINE.

SEEDING-MACHINE.

SPECIFICATION forming part of Letters Patent No. 241,924, dated May 24, 1881.

Application filed March 14, 1881. (No model.)

*To all whom it may concern:*

Be it known that I, COLUMBUS BUSWELL, of Etna, Penobscot county, Maine, have invented certain Improvements in Seeding-Machines, of which the following is the specification.

My invention is a seed-planter constructed, as fully described hereinafter, so as to regulate nicely the quantity of seed dropped, adapted to plant seed of different varieties, and extremely simple in construction and operation.

In the drawings, Figure 1 is a longitudinal section of the seed-box and attachments, either forming part of a special planter or adapted for attachment to a horse-rake. Fig. 2 is a cross-section of Fig. 1, and Fig. 3 is a plan view illustrating the adjusting-slides.

A represents the seed-box, of any suitable construction, the bottom C having chambers $a$, beneath which may be arranged the usual feed-tubes and an intermediate slide, D. Within the box are two metal plates, $b$ $b'$, one of which is fixed and the other movable, with openings $x$ $x'$, of such shape that by sliding one plate upon the other the discharge-outlets $y$ for the seed may be made greater or less, according to the character of the seed to be planted, or the quantity to be deposited at one time.

B is the feed-slide, consisting of a bar or plate, at the lower side of which are pockets $e$, into which seed may pass through contracted openings $i$. A reciprocating motion, intermittent or otherwise, is imparted to this slide through the medium of any suitable devices. The slide D is perforated, and is adjustable by means of a lever, J, suitably arranged to be under the control of the driver.

The plate $b$ is set so as to present openings $y$ of such size as will permit the requisite quantity of grain to pass to the chambers $a$ as the feed-slide B moves over said openings, the grain being retained in the chambers until it is to be discharged, when the driver, pulling the lever J, brings the openings $s$ in the slide D beneath the chambers, from which the grain at once falls.

The adjustment of the slide $b$ serves as a means of regulating the amount of grain deposited at each movement without the necessity of any further adjustments of parts or regulation of operations.

While the seed may, when necessary, be discharged instantly from each pocket, it cannot flow rapidly from the hopper to the outlet, inasmuch as the openings $i$ are contracted; but this does not interfere with maintaining the pockets comparatively full, as the openings $i$ are never closed and the seed flows constantly into the same.

I claim as my invention—

The combination, in a seed-planter, of a hopper, A, bottom C, having chambers $a$, perforated plates $b$ $b'$, one of which is adjustable, a slide, B, arranged above said plates, and having pockets $e$ and contracted openings $i$, and a perforated slide, D, and means for operating the same independently of the other slide, substantially as set forth.

In testimony whereof I have signed my name to this specification in the presence of two subscribing witnesses.

COLUMBUS BUSWELL.

Witnesses:
  LUE. F. STARKIE,
  ALFONSO B. LORING.